Patented Sept. 4, 1945

2,384,066

UNITED STATES PATENT OFFICE 2,384,066

PRODUCTION OF ACETALDEHYDE FROM ETHYL ALCOHOL BY PARTIAL OXIDATION

Frederick R. Balcar, Stamford, Conn., assignor, by mesne assignments, to U. S. Industrial Chemicals, Inc., New York, N. Y., a corporation of Delaware No Drawing. Application November 5, 1943, Serial No. 509,124

4 Claims. (Cl. 260—603)

This invention relates to the conversion of ethyl alcohol to acetaldehyde by oxidation.

Acetaldehyde obtained from ethyl alcohol has for a long time been an important raw material for the production of acetic acid. More recently it is being used as a raw material for the manufacture of butadiene which is at present the major component used in the production of certain types of synthetic rubber.

As a rule, processes involving the use of acetaldehyde operate continuously. Interruption of the production of acetaldehyde may therefore have far reaching consequences in a modern plant using this material. For this reason, elaborate precautions must be taken, and spare equipment and unusual storage facilities provided to insure continuity of operation.

The reaction $$2C_2H_5OH + O_2 \rightarrow 2CH_3CHO + 2H_2O$$

is well known, and catalysts in various forms for promoting the reaction have been suggested. A number of methods of controlling the reaction have been proposed as well as various forms of apparatus for carrying out the reaction. The available methods are not entirely satisfactory.

It is the object of this invention to provide a particularly effective method of carrying out the reaction, which is well adapted to large scale operation.

It is a further object of this invention to provide a method which gives unusually high yields, and is free from operating difficulties which ordinarily cause interruption of the production of acetaldehyde in commercial operation. I have discovered that the efficiency of operation in the oxidation of ethyl alcohol to acetaldehyde can be improved by the procedure hereinafter described. The improved method can be conducted with very little attention from the operator. Since it is not subject to frequent shut down periods, very little spare equipment or storage need be provided. In this way it affords a substantial saving in labor, materials, and plant investment.

As is well known, the oxidation of ethyl alcohol to the corresponding aldehyde is accompanied by the evolution of heat, which if not properly controlled results in poor yields and damage to the equipment. It has been proposed to operate with various degrees of insufficiency of oxygen, and with a variety of diluents such as $CO_2$, $N_2$ and steam to retard the reaction. Such methods are not readily controllable and introduce difficulties in operation.

I have found that the reaction may best be stabilized by the use of a fairly definite ratio between the heat capacity of the entering gases and the amount of oxygen supplied. When the reaction is viewed as an inverted combustion with oxygen as the fuel gas, it is seen that the final temperature of the gases leaving the reactor becomes a function of the heat capacity of the entering gases, the amount of oxygen supplied and the preheat temperature.

In order to promote the reaction most effectively, I prefer to use ethyl alcohol vapor as the diluent, and provide such an amount of excess alcohol that the heat capacity of the entering gas is equivalent to about 0.5 lb. of water per cubic foot of oxygen supplied. "Heat capacity" is defined in "International Critical Tables," vol. I, page 35, as the heat per unit of mass per degree of rise, required to produce a very small rise in temperature. I then regulate the preheat temperature so as to obtain an exit gas temperature of about 530–550° C. Under these conditions an exceedingly rapid reaction may be obtained, but one which is nevertheless subject to complete and effective control.

It is necessary, moreover, to employ a suitable catalyst. Copper, brass, silver and other metals and metal oxides have been proposed as catalysts for the reaction. They may be mounted on a support such as asbestos, or pumice. Or they may be placed in the reactor in the form of gauze, wire, pellets, ferrules, crystals obtained by electrolysis, or metal trimmings. Here it may be noted that in laboratory experiments some oxidation will be obtained with a wide variety of catalysts in almost any form.

I have found that smooth commercial operation can best be established and maintained by the use of massive silver in the form of short rods, each rod having one end enlarged, resembling an ordinary rivet. The precise form is not essential so long as the rods have integral spacing means. With silver in this form, a bed of catalysts may be prepared in which the numerous individual pieces interlock, and are in intimate thermal contact with each other, and in which, due to the enlargement of the ends of the rods, tortuous channels are provided for the passage of the gas.

In this way very good contact between the reacting gases and the catalyst is provided. The silver rivets, being excellent conductors of heat, quickly dissipate any tendency toward local overheating or local cooling. Because of the mechanical precision and uniformity with which rivets can be produced, a uniform catalyst bed only a few inches in depth can be produced over an area measured in square feet. Since great uniformity is readily obtained in this manner, each portion of the bed may be utilized to the fullest extent. In other words, the entire area of the catalyst will operate uniformly even with a throughput only slightly lower than that which would result in complete extinction of the reaction.

In order to obtain satisfactory operation, I have found it advantageous to condition the catalyst carefully when new. I do this by operating for a relatively short time with a proportion of oxygen higher than that used in the subsequent operation, deliberately producing an excessive temperature. In a short time the surfaces of the rivets become etched after which the proportion of oxygen may be reduced and stable operation obtained at the optimum temperature. Conditioning may be secured also by heating the rivets in an oxidizing flame.

Since both horizontal and vertical conduction of heat throughout the catalyst bed are important in bringing the entering gas to the reaction temperature and in equalizing temperatures across the bed, details relating to the dimensions of the bed, and the quantity of heat produced within the bed are important. I have found that for best results the depth of the bed prepared in the manner described should be of the order of 2 inches or more to provide sufficient conduction of heat upstream to heat the gases from the preheat temperature to the lowest temperature at which the reaction begins.

The horizontal conduction of heat is important in eliminating hot spots. It is important therefore to adjust the total heat produced in the most effective proportion to the mass of silver provided not only for catalytic surface but for heat conduction purposes.

Since as noted previously, the amount of oxygen supplied is a direct measure of the total heat produced, the ratio between the oxygen fed to the system and the total mass of silver available for conduction of heat must be adjusted carefully. I have found that about 4 lbs. of silver in the form of rivets should be provided for each cubic foot of oxygen used per minute.

Not only does this mass of silver in the form of rivets provide adequate catalytic surface and heat conductivity, but also it provides a very useful reservoir for heat storage. With such a mass of silver at or near the reaction temperature, a momentary fluctuation in inlet gas composition will not immediately change the temperature of the catalyst bed. With a smaller mass of silver per cubic foot of oxygen consumed per minute, a momentary drop in inlet oxygen concentration might lower the temperature of the catalyst so quickly that the reaction will suddenly stop, and will not be re-established by merely restoring the normal oxygen concentration of the gas.

With the ratio of oxygen used to silver provided as hereinbefore described, a uniform temperature throughout the bed can be established and maintained, thereby providing ideal conditions for smooth uninterrupted operation of the unit.

The following will serve as an illustrative example of the application of the invention: About 90 pounds of silver rivets ¼" long by $\frac{3}{32}$ inch diameter with round heads $\frac{3}{16}$" diameter were placed in an 18" diameter reactor forming a bed about 2" in depth. The catalyst was heated to about 300 to 400° C. About 750 lbs. per hour of 95% by volume ethyl alcohol was vaporized and mixed with about 5200 cubic feet per hour of air. The gas mixture was preheated to about 130° C., and then passed through the catalyst bed. The temperature of the gas leaving the catalyst bed was about 530° C. Substantially complete consumption of the oxygen was effected. The yield of acetaldehyde was equal to 97.3% of the alcohol consumed.

Any suitable apparatus may be used for the practice of the invention. Conveniently the silver rivets may be supported between foraminous sheets of stainless steel or other metal which does not affect the reaction. The bed of catalyst thus provided may be disposed in a chamber with an inlet and an outlet for the gases. The details of the apparatus form no part of the present invention.

Various changes may be made in the details of procedure without departing from the invention or sacrificing the advantages thereof.

I claim:

1. The method of producing acetaldehyde by oxidation of ethyl alcohol which comprises establishing a bed of massive silver in the form of short rods having spacing means integral therewith, heating the catalyst bed to a temperature of 300–400° C., forming a mixture of ethyl alcohol vapor and air containing alcohol vapor in excess so that the heat capacity of the mixture formed is equivalent to the heat capacity of about one-half pound of water per cubic foot of oxygen supplied, preheating the mixture, contacting it with the catalyst bed at an elevated temperature to cause reaction between the oxygen and the alcohol and regulating the preheat temperature so that the temperature of the mixture after leaving the catalyst is about 530–550° C.

2. The method as in claim 1 in which the silver is subjected initially to an oxidizing atmosphere at high temperature.

3. The method as in claim 1 in which the bed consists of about four pounds of silver per cubic foot of oxygen used per minute.

4. The method as in claim 1 in which the bed of silver is approximately two inches thick.

FREDERICK R. BALCAR.